Dec. 3, 1968　　　W. C. COOPER　　　3,414,703
WELDING FIXTURE

Filed Oct. 7, 1965　　　3 Sheets-Sheet 1

INVENTOR.
William C. Cooper
BY Thomas J. Dugan
ATTORNEY

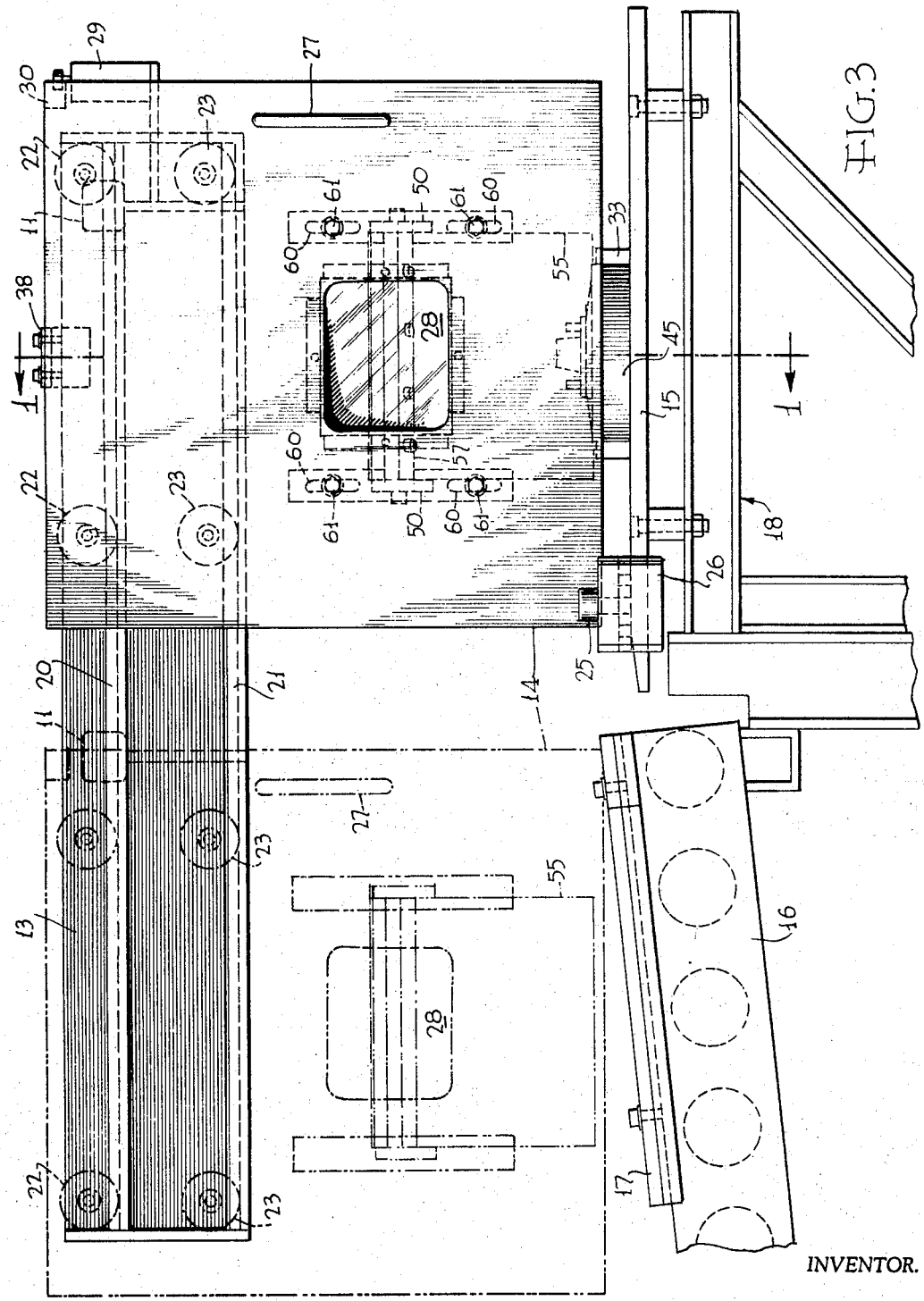

United States Patent Office 3,414,703
Patented Dec. 3, 1968

3,414,703
WELDING FIXTURE
William C. Cooper, Royal Oak, Mich., assignor to The Budd Company, Philadelphia, Pa., a corporation of Pennsylvania
Filed Oct. 7, 1965, Ser. No. 493,724
4 Claims. (Cl. 219—158)

ABSTRACT OF THE DISCLOSURE

A welding fixture for protecting the operator and workpiece and including a shield having a sighting window placed between the operator and the workpiece and a portion of the shield structure is also positioned above and closely adjacent the workpiece to prevent spattering the remainder of the workpiece during the welding operation.

---

Figure 1:
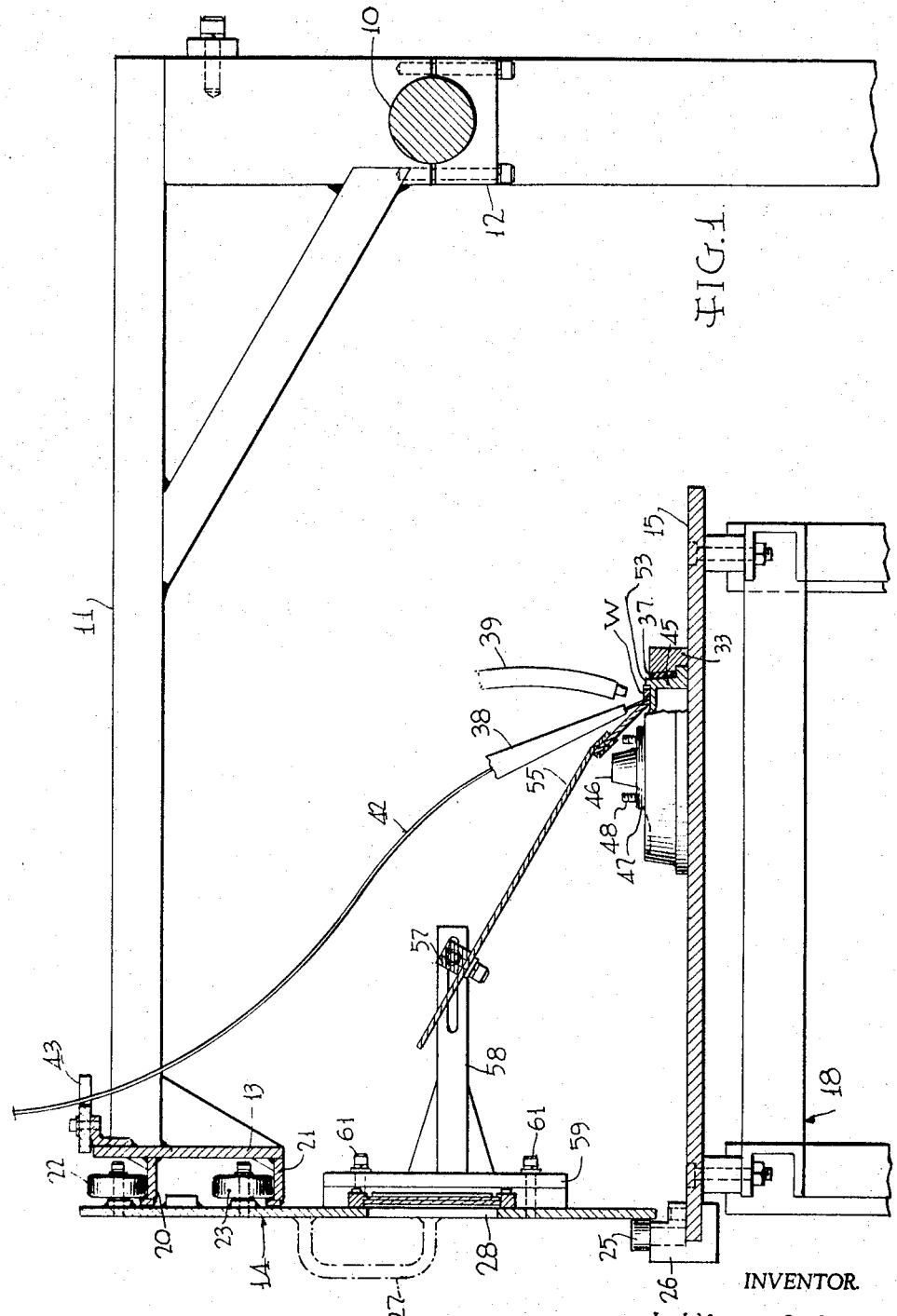

This invention relates to a welding fixture for protecting the operator and workpiece from glare, burns and spatter during welding and has for an object the provision of improvements in this art.

The invention has been developed in connection with automatic welding of automotive brake drum assemblies, particularly for jig arc welding of balance weights on such assemblies, and for providing means for accurately locating the workpiece, means for accurately locating the weight in position to be welded, and means for shielding the operator and workpiece from sparks and spatter. However, the invention may have other uses and will not be limited to brake drum assemblies.

The brake drum assemblies here dealt with comprise a drum and head having stud bolt holes, a hub with a flange having stud bolt holes, and stud bolts staked in the holes of the drum head and hub flange with their threaded ends exposed above the hub flange when the open end of the drum is placed on a table support in a position to have a weight welded on the head of the drum at a predetermined point along and near the outer periphery. The weight is located outside the ring of exposed stud bolt ends but unless means are provided for protecting them the stud bolts and other finished parts of the workpiece assembly will be splashed with metal during welding, making it necessary to clean up the adherent splattered metal after welding.

The assemblies which are received for weight attachment according to the present invention will have been balance tested on a machine of known type and will bear a paint spot of a certain distinctive color at the circumferential center of the weight location and another paint spot of another distinctive color to indicate by a guide code the amount of weight to be added—that is, which of a number of preformed weights of different weight values which are provided will be selected for use by attachment. Each weight has a central concavity which is positioned at the point indicated on the workpiece, which will be the electrode position where a plug weld will be made by a gas protected welding arc. Means are provided for holding the workpiece in accurate position; and when the operator observes that the position of the workpiece and the weight are correct he closes a shielding door which carries with it a workpiece shield and which operates a switch when moved to the closed position to condition or initiate the welding operation.

It is, therefore, one of the particular objects of the invention to provide a welding fixture which will accurately position the workpiece with the part to be welded thereto so that the part can be properly welded to the workpiece.

Another object is to provide a welding fixture which will fully protect the operator and workpiece, outside the weld zone, from spatter and which will preclude the start of welding until the shields have been properly positioned.

Another object is to provide a welding fixture which is relatively simple and inexpensive and easy to adjust, operate and repair.

Figure 2:
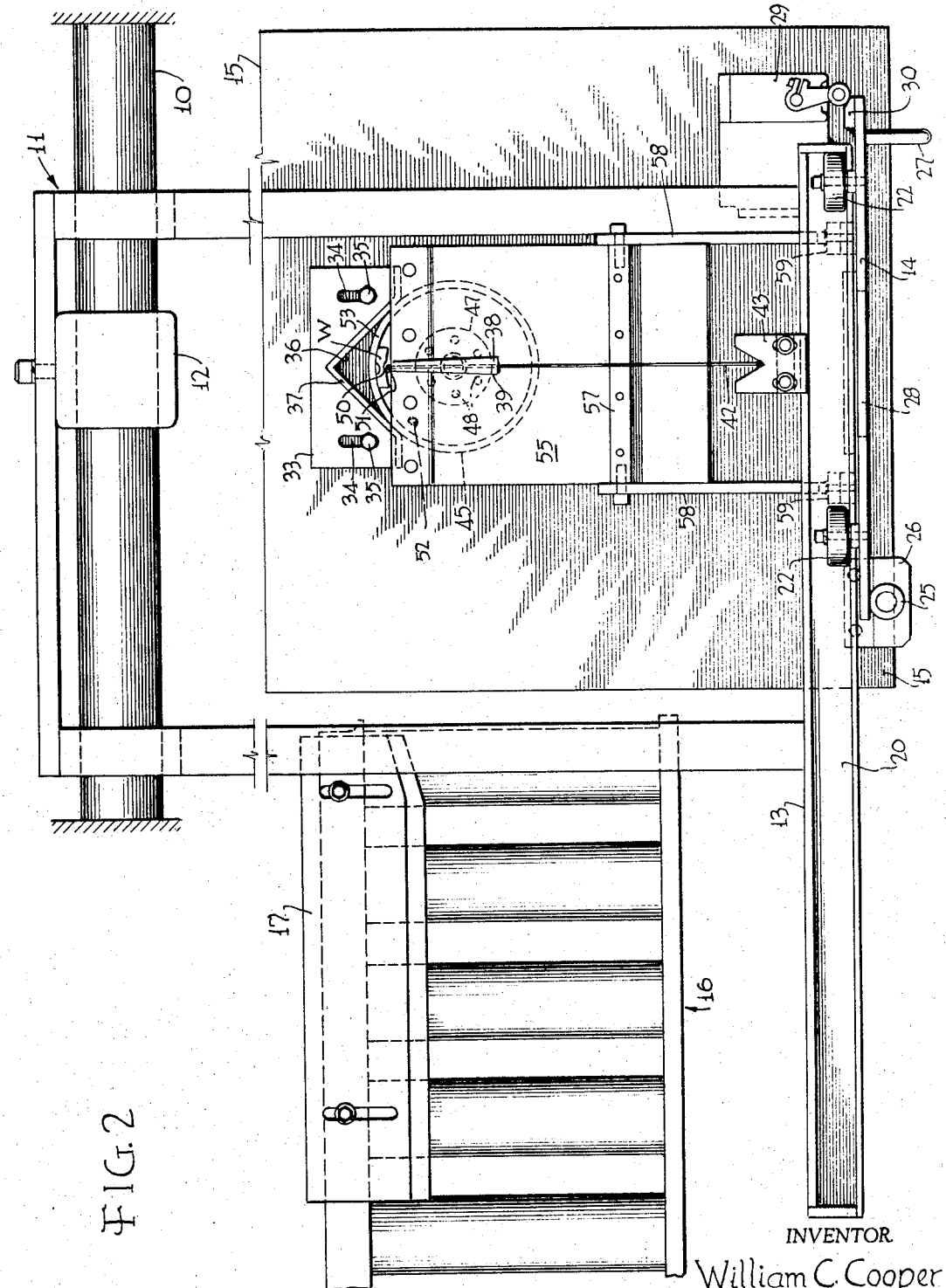

The above and other objects of the invention, as well as various features of novelty and advantages, will be apparent from the following description of an exemplary embodiment, reference being made to the accompanying drawings, wherein:

FIG. 1 is a central vertical section of the welding fixture with a workpiece and balance weight in position to be welded;
FIG. 2 is a top plan view;
FIG. 3 is a front elevation.

The welding fixture provides a work table, gas-protected welding equipment with wire electrode supply and feed, and a door shield carrying an arc splatter shield. Little or no side enclosure is needed, leaving the sides open for view and access.

As shown herein, a large beam 10 carried on a base frame 18 provides the support for the upper parts of the welding fixture, a cantilevered supporting frame 11 being secured to the beam 10, as by a clamp 12. The front end of the overhanging frame 11 carries a front frame 13 which supports a sliding shield door 14. The base frame 18 carries a workpiece supporting table 15. At one side the base frame carries a roller conveyor 16 and an adjustable workpiece guide 17 for the removal of finished workpieces. Except for the door 14, the front is entirely open and accessible for the operator to slide workpieces from a supply table at the right to the table 15 and to slide finished workpieces from the table 15 to the left out on the roller conveyor 16.

The front frame 13 comprises upper and lower channel-shaped trackways 20 and 21 for supporting rollers 22 and 23, respectively, of the slidable shielding door 14. At the bottom the door is guided by a roller 25 carried by a bracket 26 secured on the workpiece supporting table 15.

The door has a handle 27 for manual movement and a protective sighting window 28. A welding control switch 29 is mounted on the frame 13 in a position to be operated by a cam member 30 carried by the door, the arrangement being such that welding current cannot be provided unless the shielding door is closed.

The table 15 is provided with a workpiece positioning gage 33 which is adjustable by slots 34 therein and clamp screws 35. The gage has a V-shaped notch 36 to take workpieces of different diameters and an insulating pad 37 on the vertically wide front edge to prevent grounding on the gage.

The welding equipment comprises a welding electrode wire guide 38 and a nozzle 39 for inert protective gas, both carried by the upper supporting frame 11. A reel of wire with feed control means is carried above the fixture but for simplicity the wire guide and nozzle supports and the wire supply and controls are omitted from the drawings. The electrode wire 42 is shown as is also a V-shaped adjustable slack wire guide 43.

The workpiece here shown comprises a brake drum 45 and a hub member 46 with a flange 47, lug stud bolts 48 being staked in the matching holes of the drum head and the hub flange and projecting upwardly when the composite workpiece is placed on the supporting table with the open end of the drum resting on the table, as shown.

It is desired to weld a weight W on the back of the head of the drum, the weight having a central recess 50 where a plug weld is to be made to secure the weight in place. The weight is placed by hand in a position to locate the center of the recess 50 at a paint balance spot 51 made on the head by the balancing machine. Another paint spot 52—a weight spot—by a color code, designates the size of the weight to be added. Several sizes of weights will be stocked nearby for selection by the operator.

The drum shown has a weight-retaining flange 53 which will correctly position the weight radially so that it is only necessary to place the locational paint spot 51 directly beneath the end of the welding wire electrode 42 and directly in front of the V-shaped notch in the gage 33 and position the weight circumferentially to correct position. When the drum does not have the rib or flange 53 the weight is placed with its recess at the weld spot and its curved outer edge is brought parallel with the curved outer edge of the drum. This can readily be sighted visually but, if desired, a supplemental weight positioning gage may be provided, as by making the V-shaped gage shown deep enough vertically to position the weight as well as the drum.

As stated, it is undesirable to splash molten metal on the lug bolts or adjacent wheel disk-fitting surfaces. In order to protect these parts there is provided a splash shield 55, as of asbestos, carried by an arm 56 which is longitudinally, turnably, and horizontally adjustable by a holding clamp 57 carried in the slotted end of a bracket 58 which is mounted on a plate 59 carried on the inner side of the door and adjusted by a slot 60 and clamp screws 61 for different heights.

In operation, with the shielding door 14 open, the operator pushes a workpiece in on the table 15 until it makes proper positioning contact with the gage 33. He positions it circumferentially to place the balance spot 51 directly below the end of the wire electrode 42. He then places a weight W on the rear edge of the drum with the recess 50 of the weight at the paint spot 51 and its outer edge parallel with the outer circumference of the drum—against the rib or flange 47 when the drum has this flange—the particular weight selected for use being designated by the code color of the weight spot 52 on the drum.

The door is closed, carrying with it the anti-splatter shield 55 to protect the workpiece. Closure of the door operates the switch 29 to condition or control the circuit for welding. The switch may actually initiate the welding cycle but, if desired, there may be a control switch to give the operator final supervision of the start of welding.

The window in the door permits the operator to view the parts inside when the door is closed.

The weld is a light one and is quickly made. After welding, the door is opened and the workpiece pulled away from the gage 33 and pushed off to one side upon the roller conveyor 16 which carries it by gravity to a desired point of disposal such as a conveyor box or to a position in a work line or the like.

It is thus seen that the invention provides a convenient, simple, and efficient welding fixture which greatly expedites the operation while fully protecting the operator and the workpiece from the welding arc.

While one embodiment of the invention has been described for purposes of illustration, it is to be understood that there may be various embodiments and modifications within the general scope of the invention.

I claim:

1. A welding fixture comprising in combination, a workpiece supporting table, a rear gage for said table for holding a workpiece in proper position relative to a welding electrode, a shielding door movable across the front of the table and workpiece, and a work shield mounted on said door and movable into position above and closely adjacent the workpiece between the welding zone of the workpiece and the remaining portions of the workpiece to protect said remaining portions from splash during welding.

2. A welding fixture as set forth in claim 1, further characterized by the fact that the mounting means for said workpiece shield on said door includes means for vertical, longitudinal, and vertical swinging movement of the workpiece shield.

3. A welding fixture as set forth in claim 1, which further includes a weld control switch and an operator for the switch carried by the door.

4. A welding fixture for a workpiece which includes a brake drum, a hub with a flange and stud bolts staked in holes in the drum head and hub flange, the drum head having a balance weld spot and a weight size indicating spot thereon, comprising in combination, a workpiece supporting table, a V-shaped adjustable gage on the rear of said table adapted to hold said workpiece with the balance spot beneath a welding electrode, said workpiece having a weight to be welded thereto with a medial recess of the weight at the balance spot beneath the electrode, a shielding door movably mounted to slide horizontally over the front of said table, a work shield adjustably mounted on the rear of said door in a position to come between the welding electrode and stud bolts and being closely adjacent thereto when the shielding door is closed, a weld control switch, and means for operating said switch when said door is closed.

References Cited

UNITED STATES PATENTS

| 1,493,656 | 5/1924 | Von Henke | 219—57 |
| 1,654,562 | 1/1928 | Taylor | 219—97 |
| 2,459,812 | 1/1949 | Griffiths | 219—74 |

FOREIGN PATENTS

| 445,623 | 6/1927 | Germany. |

RICHARD M. WOOD, *Primary Examiner.*

BARRY A. STEIN, *Assistant Examiner.*